March 29, 1960 L. R. F. HARRIS 2,931,013

ELECTRICAL SELECTING SYSTEMS

Filed Jan. 18, 1954 5 Sheets-Sheet 1

INVENTOR
Lionel R. F. Harris

BY

Holcombe, Wetherill & Brisebois ATTORNEYS

March 29, 1960 L. R. F. HARRIS 2,931,013

ELECTRICAL SELECTING SYSTEMS

Filed Jan. 18, 1954 5 Sheets-Sheet 2

INVENTOR

Lionel R. F. Harris

BY

Holcombe, Wetherill & Brisebois ATTORNEYS

March 29, 1960 L. R. F. HARRIS 2,931,013

ELECTRICAL SELECTING SYSTEMS

Filed Jan. 18, 1954 5 Sheets-Sheet 3

INVENTOR
Lionel R. F. Harris

BY

Holcombe, Wetherill & Brisebois ATTORNEYS

March 29, 1960 L. R. F. HARRIS 2,931,013

ELECTRICAL SELECTING SYSTEMS

Filed Jan. 18, 1954

5 Sheets-Sheet 4

INVENTOR

Lionel R. F. Harris

BY

Holcombe, Wetherill + Brisebois ATTORNEYS

March 29, 1960 L. R. F. HARRIS 2,931,013

ELECTRICAL SELECTING SYSTEMS

Filed Jan. 18, 1954 5 Sheets-Sheet 5

INVENTOR
Lionel R. F. Harris
BY
Holcombe, Wetherill & Brisebois ATTORNEY

United States Patent Office 2,931,013
Patented Mar. 29, 1960

2,931,013

ELECTRICAL SELECTING SYSTEMS

Lionel Roy Frank Harris, Kenton, England, assignor to Her Majesty's Postmaster General, London, England Application January 18, 1954, Serial No. 404,760

Claims priority, application Great Britain January 20, 1953

5 Claims. (Cl. 179—18)

This invention relates to electronic selecting systems and has particular but not exclusive reference to selecting systems for automatic telephone exchanges in which a selection has to be made automatically of a circuit, switch or the like from among a number of circuits, switches or the like all equally suited to some desired operation or function of the system. There are many instances in automatic telephony in which the selection of one of a number of equally suitable choices is required.

In its most general form, selection in automatic telephone exchanges involves the selection and indication of one of a number of marked circuits in a group of circuits. In this specification, time spaced pulse trains are referred to and it is convenient to describe what is meant by the terms pulse and pulse trains in this specification. A pulse is a sudden change of current or voltage which lasts for a brief time period. A succession of pulses on one lead equally spaced in time constitutes a pulse train. A group of pulse trains is said to be equally time spaced if the pulse repetition frequency is the same in all trains in the group and if the pulses of all the trains in the group occur at equal time intervals. Two pulse trains are said to be coincident if all the pulses of the two pulse trains coincide. Combinations of a plurality of pulse trains all appearing on one lead such that the time intervals between consecutive pulses appearing on the lead are not equal are not to be included in the definition of a pulse train, but will be referred to herein as combinations of pulse trains.

The present invention provides an improved system which may be used to select one circuit out of a number of marked circuits in a group of circuits.

According to the present invention a pulse selecting system comprising in combination a pulse lead connected to a device responsive to one of pulses applied to it over the pulse lead, a plurality of pulse coincidence gates to which the output of said device is connected, a plurality of registers, each register receiving the output from a different one of the coincidence gates and, for each pulse coincidence gate, a lead for applying to the gate a unique combination of pulses of said group of pulses whereby the register connected to the gate is operable by any pulse of said combination, and a number of indicating leads each connected to a different register.

The combinations of registers may be taken a fixed number at a time and such that the number of registers in the set taken a fixed number not less than two at a time is equal to the number of circuits in the group of circuits.

Examples of the systems according to the invention will now be described in greater detail with reference to the accompanying drawings of which:

Figure 1:
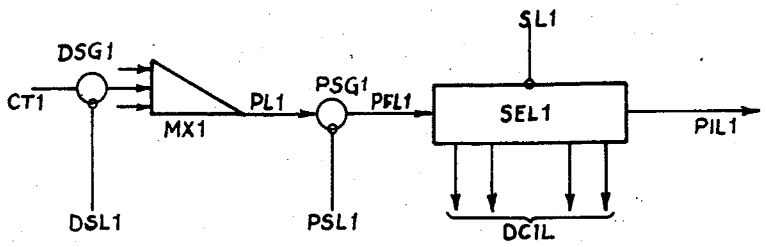
Fig. 1 is a block schematic diagram of one example.

An arrangement for selecting one of a number of circuits marked out of a group of circuits is shown in Fig. 1. This shows a marking lead CT1 which is provided for one circuit in a group of circuits and which is connected via a D.C. suppression gate circuit DSG1 to a multiplex pulse generator MX1. The D.C. potential of the marking lead CT1 indicates whether the circuit for which it is provided is among those from which a selection is to be made.

Corresponding leads provided for other circuits in the group are also connected to multiplex pulse generator MX1 which generates on its output lead PL1 the pulse trains characterising the marked circuits. Lead PL1 is connected via pulse suppression gate circuit PSG1 and lead PFL1 to selecting means Sel 1 which includes a set of registers. One pulse of one pulse train applied to Sel 1 operates a combination of registers in the set of registers and this selects one of the marked circuits. The selected circuit may be indicated by the presence of its pulse train on pulse indicating lead PIL1 or it may be indicated by D.C. signals on a combination of D.C. indicating leads DC1L of which there is one for each register in the set. If a circuit is marked on its indicating lead CT1 but is nevertheless not required to be among those from which a selection is to be made, its pulse train may be prevented from reaching Sel 1 by the application of a coincident suppression pulse train on lead PSL1 connected to gate circuit PSG1, or by the application of a suitable suppressing potential over a lead such as DCL1 connected to suppression gate DSG1 to which lead CT1 is connected. When suitable action has taken place as a result of such a selection, the operated selecting means may be released by the application of a releasing signal over a lead SL1 which may, for example, be derived using a pulse trigger circuit operated a fixed time after the operation of the registers, or alternatively which may appear upon the disappearance of the pulse of the train associated with the selected circuit from the pulses on the common marking lead connected to Sel 1 and which occurs after selection or alternatively the releasing signal may appear upon the receipt of some suitable releasing signal from some other source.

The disappearance after selection of a pulse train from the lead PFL1 may be effected in a manner similar to that described in the specification of copending application, Serial No. 402,896, filed January 8, 1954, by Lionel Roy Frank Harris, now Patent No. 2,927,161.

The marking pulse trains of the free marked circuits are applied on lead PFL1 to the blocking device BD1 which produces a constant amplitude output for an input greater than a certain minimum level and also possesses a blocking feature such that after producing a single pulse of a marking pulse train it is inoperative for a time. This device might be, for example, the well known blocking oscillator. Its function is to ensure that a single marking pulse of sufficiently large amplitude is applied to the selecting means to avoid partial operation of the succeeding selecting means and thereafter to suppress all pulses that appear on lead PFL1 for a period sufficiently long to ensure the proper operation of the selecting means. If for some reason the selecting means are not operated by the first single marking pulse of a marking pulse train from the blocking device BD1 then after a given time the blocking device BD1 generates a further single marking pulse, and so on until registers are operated.

The output of the blocking device BD1 is connected by a common lead CL1 to a group of coincidence gate circuits such as PCG1 and PCG2 associated with registers such as REG1 and REG2 respectively. The number of registers in the group is such that the number of combinations of registers taken not less than two at a time shall be not less than the number of circuits in the group of circuits. The coincidence gate circuits are supplied with a combination of pulse trains in a manner such as that described in the specification of the above mentioned patent to Harris and each coincidence gate circuit is associated with a register and a second coincidence gate circuit which is supplied with the same combination of pulse trains as the first coincidence gate circuit. The outputs from the second set of coincidence gate circuits are connected to a further coincidence gate circuit, common to the set and this further coincidence gate circuit produces an output when any two of its inputs are stimulated, which output is coincident with the selected marking pulse train.

In order to make the operation of the selecting means clearer, the selection of one of a group of marking pulse trains will be described with reference to Fig. 2. For the purposes of this description the pulse train distribution will be considered to be as coincident pulse trains on pairs of leads and therefore the registers in the selecting means will be arranged in one set the number of combinations of registers in the set taken two at a time being at least equal to the number of circuits in the group of circuits. For each selection two of the registers in the set of registers must be operated.

The marking pulse trains of the free marked circuits are applied on lead PFL1 to the blocking device BD1 which allows transmission of a single pulse of one of the marking pulse trains on lead CL1 and thereafter blocks the transmission of pulses for a period sufficiently long for the registers to be operated. Lead CL1 is connected to all the coincidence gate circuits such as PCG1 and PCG2. Combinations of pulse trains which include the marking pulse trains of all the circuits in the group are applied to pulse leads of which two PL2 and PL3 are shown in the figure. For the purposes of explanation the combinations of pulse trains on lead PL2 and PL3 will be assumed to include the selected pulse train, one of whose pulses has been transmitted through blocking device BD1. The combinations of pulse trains on leads PL2 and PL3 are connected to the coincidence gate circuits PCG1 and PCG2 through delay devices TD1 and TD2 which compensate for delay in the cables and in blocking device BD1.

Each pulse of one of the marking pulse trains on lead CL1 coincides with pulses of the combinations of pulse trains on leads connected to coincidence gate circuits PCG1 and PCG2 which therefore produce an output to operate registers REG1 and REG2. The registers REG1 and REG2 then D.C. indicate the selected circuit on leads DCIL1 and DCIL2 and also operate the gate circuits PG1 and PG2 which are connected to the combinations of pulse trains on leads PL2 and PL3. These combinations of pulse trains include that of the selected circuit so that by connecting the otuputs of gate circuits PG1 and PG2 to a further coincidence gate circuit PCG3 the marking train of the selected circuit is produced on the lead connected to the input of amplifier AMP1, the output of which pulse indicates the selected circuit. It is arranged that an inhibiting signal derived, for example, from the change in potential of the D.C. indicating leads is applied to the blocking device BD1 on lead SL2, to prevent any further marking pulses being applied to the registers once the registers have been operated by a marking pulse. Operated registers are restored by means of an inhibiting signal applied on lead SL1 and which may be derived in the manner described above with reference to Fig. 1.

Figure 3:
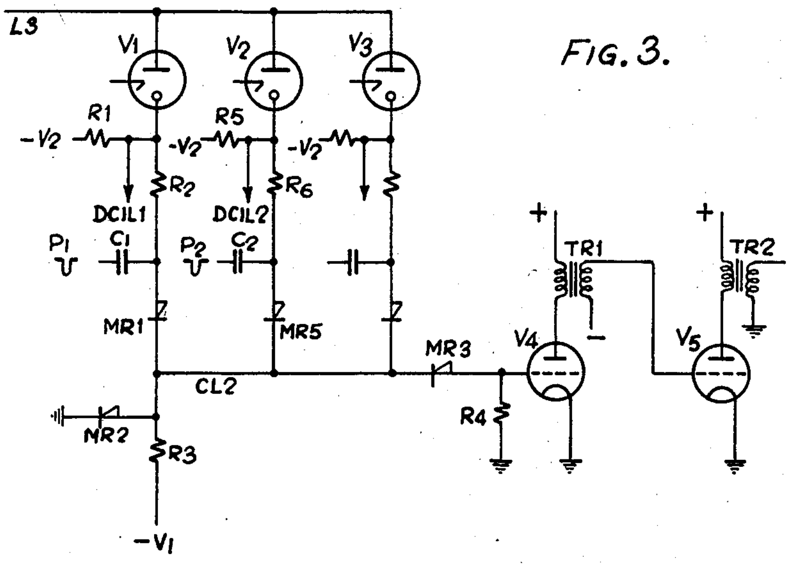
Fig. 3 is a circuit diagram of part of Fig. 2.

The selecting means described in the present application might for example take the form shown in Fig. 3. For the registers cold cathode gas discharge tubes V1, V2 and V3 are used. The operation of the circuit will be described considering only the circuits of V1 and V2 as being typical registers in a group of registers.

Figure 2:
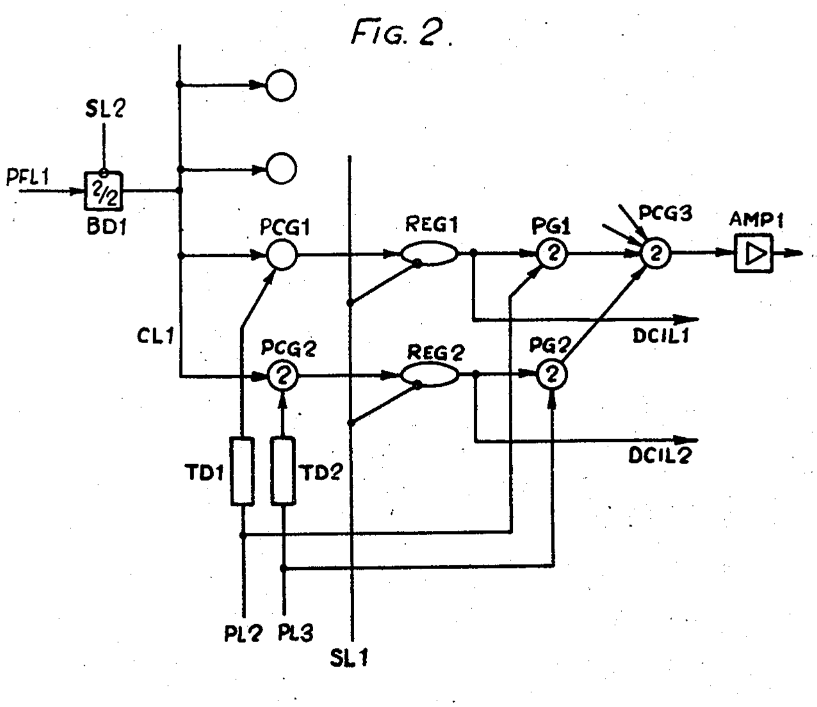
Fig. 2 is a circuit diagram showing part of Fig. 1 in logical symbols.

Referring now to Fig. 2 the input blocking device BD1 and the coincidence gate circuits PCG1 and PCG2 might take any known form and the operation of the selecting means will be described from the points where the outputs of coincidence gate circuits PCG1 and PCG2 are connected to registers REG1 and REG2. It will be appreciated that the outputs from the coincidence gate circuits must be sufficient to operate the registers when required.

Referring again to Fig. 3, V1 and V2 will be considered to be the registers REG1 and REG2 respectively in the selecting means associated with the selected marking pulse trains. When the selecting means is unoperated, the potential on lead L3 connected to the anodes of the cold cathode tubes is less than that required to maintain a discharge in the latter. Under those conditions a current flows through resistor R4, rectifier MR3, common lead CL2 and resistor R3 towards the source of negative potential —V1 to which one end of resistor R3 is connected. This causes the control grid of valve V4 to be at a negative potential with respect to earth so that valve V4 is non-conducting. The rectifiers MR2, MR1 and MR5 are non-conducting so that the combinations of negative-going pulse trains P1 and P2 applied to capacitors C1 and C2, do not appear on common lead CL2. The potential of leads DCIL1 and DCIL2 is approximately —V2.

The potential on anode supply lead L3 is maintained at more than that required to maintain a discharge in the cold cathode tubes, but less than that required to strike the said tubes. If the cold cathode tubes are then struck by applying a suitable potential to their strikers, as happens when a pulse generated by device BD1 has been applied to gates such as PCG1 and PCG2, an equal current flows in each of the cold cathode tubes thus raising the potential of their cathodes and of leads DCIL1 and DCIL2. The current through tube V1 flowing through resistor R2 and rectifier MR1 is just sufficient when flowing through resistor R3 to raise the potential of common lead CL2 to earth potential thus causing valve V4 to conduct. The equal current from tube V2 causes rectifier MR2 to conduct and carry this current.

A negative going pulse of the combination of pulse trains P1 applied to capacitor C1, occurring at a time when no pulses of the combinations of pulse trains P2 is present on C2, will bias rectifier MR1 to its non-conducting state for the duration of the pulse, so preventing the passage of current from tube V1. The current flowing in rectifier MR2 will also cease for the duration of the pulse but the potential of lead CL2 remains unchanged at earth potential, the current in resistor R3 being maintained by that flowing through tube V2. If a pulse of a combination of pulse trains P2 applied to capacitor C2, occurs at a time when no pulse from a combination of pulse trains P1 is present on C1 a similar re-arrangement of currents flowing, takes place and the potential of lead CL2 remains at earth potential. However when pulses from combinations of pulse trains P1 and P2 coincide the currents flowing in rectifier MR2 and resistor R2 are no longer maintained and the potential of common lead CL2 falls towards —V1 cutting off the anode current of valve V4 for the duration of the coincident pulses. In this manner coincident pulses of the combinations of pulse trains P1 and P2 are caused to appear on common lead CL2 and to be amplified by the two stage amplifier composed of valves V4 and V5 coupled together by transformer TR1. The output is taken from the secondary of transformer TR2. The potential on lead L3 is lowered to extinguish the cold cathode tubes.

Thus, if means already described are caused to strike two of the cold cathode tubes in the group of cold cathode tubes, then the marking pulse train of the selected circuit is generated and the selected circuit is indicated by means of D.C. potentials on combinations of leads such as DCIL1 and DCIL2.

Figure 4:
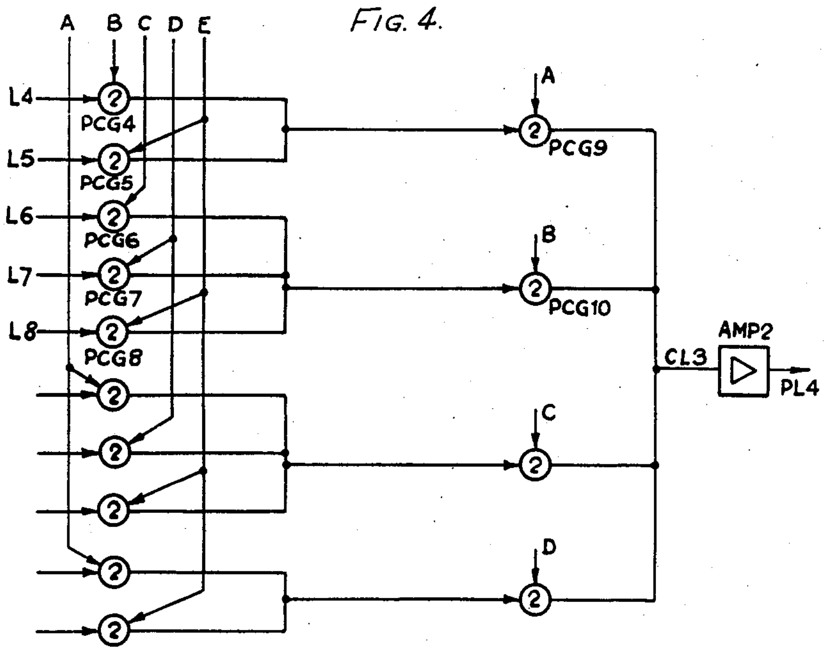
Fig. 4 shows one method of deriving pulse trains.

A means for generating the marking pulse trains might, for example, take the form shown in Fig. 4. Leads A, B, C, D and E carry combinations of pulse trains arranged as described in the specification of the above mentioned patent to Harris, so that any of the pulses may be made effective by connecting a suitable combination of pulse leads to a coincidence gate circuit.

The pulse trains on the group of pulse leads A, B, C, D and E are arranged so that if the leads are required to be connected to coincidence gates two at a time any of the pulses may be made effective in any of the gate circuits. It is convenient instead of using individual coincidence gates for each circuit to use two stages of modulation to produce the respective pulse trains which are coincident on the various pairs of leads. In the first stage of modulation, operating leads are each connected to a coincidence gate circuit each of which has connected to it one of the pulse leads in the group of pulse leads. These first stage coincidence gate circuits are arranged in groups such that no pulse lead is connected to more than one coincidence gate circuit in each group. The outputs from all the gates in each group are then commoned and each common lead is connected to a coincidence gate circuit in the second stage of modulation. Each second stage gate circuit has connected to it one of the pulse leads in the group of pulse leads, this pulse lead being one not already in use in the associated group of first stage gate circuits.

If the outputs of a number of such second stage groups of coincidence gates are combined onto a common lead then by a suitable arrangement of pulse leads any of the marking pulse trains may be produced on that common lead by stimulating the appropriate operate lead or leads.

In Fig. 4 coincidence gate circuits PCG4 and PCG5 form a first stage group, and are connected to a second stage coincidence gate circuit PCG9. First stage coincidence gate circuits PCG4 and PCG5 are connected to pulse leads B and E respectively and the second stage coincidence gate circuit PCG9 is connected to pulse lead A. Thus second stage coincidence gate circuit PCG9 will provide for the combination of pulse leads A and B, and A and E, when operating leads L4 and L5 are respectively stimulated. The first stage group could include two more coincidence gate circuits having pulse lead C connected to one and pulse lead D connected to the other so that the second stage gate circuit PCG9 could provide all the combinations of the other pulse leads taken one at a time with pulse lead A.

First stage coincidence gate circuits PCG6, PCG7 and PCG8 are connected to pulse leads, C, D and E respectively and to second stage gate circuit PCG10 to which is connected pulse lead B and these coincidence gate circuits can provide on the output of second stage gate circuit PCG10 all the combinations of the pulse leads C, D and E feeding the first stage group, taken one at a time with pulse lead B. The outputs of the two second stage gates PCG9 and PCG10 together with those of further second stage gate circuits each fed with a different pulse lead in the group of pulse leads, are commoned onto a lead CL3, which is connected to amplifier AMP2. Any of the marking pulse trains may be produced from the output lead PL4 of amplifier AMP2 by stimulating the appropriate operate lead. For example, stimulating operate lead L4 produces on lead PL4 the marking pulse train that appears on both pulse leads B and A or stimulating L6 produces the marking pulse train that appears on both pulse leads B and E and so on for the other marking pulse trains.

In Fig. 2 of the drawings there is shown a method of obtaining a pulse indication of a marked circuit. This is achieved by means including coincidence gates such as PCG1 and PCG2 of that figure which are operated by an output pulse from the blocking oscillator BD1 and coincident pulses on the pulse leads PL2 and PL3. Instead of the marking pulse trains being generated coincidentally on a combination of a fixed number of pulse leads the combinations of pulse trains may take the form described in the specification of the above mentioned patent to Harris. In that specification each pulse train in a set of pulse trains is generated on one pulse lead or coincidentally on a combination of pulse leads individual to it. The combinations of pulse leads are not restricted to a fixed number of pulse leads.

Figure 5:
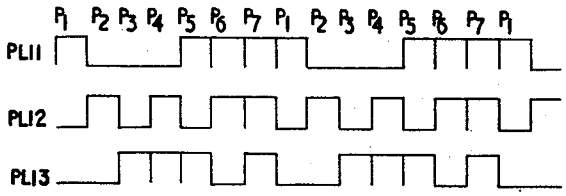
Fig. 5 shows the wave forms of combinations of pulse trains appearing on the pulse leads of the circuit shown in Fig. 6.
Figure 6:
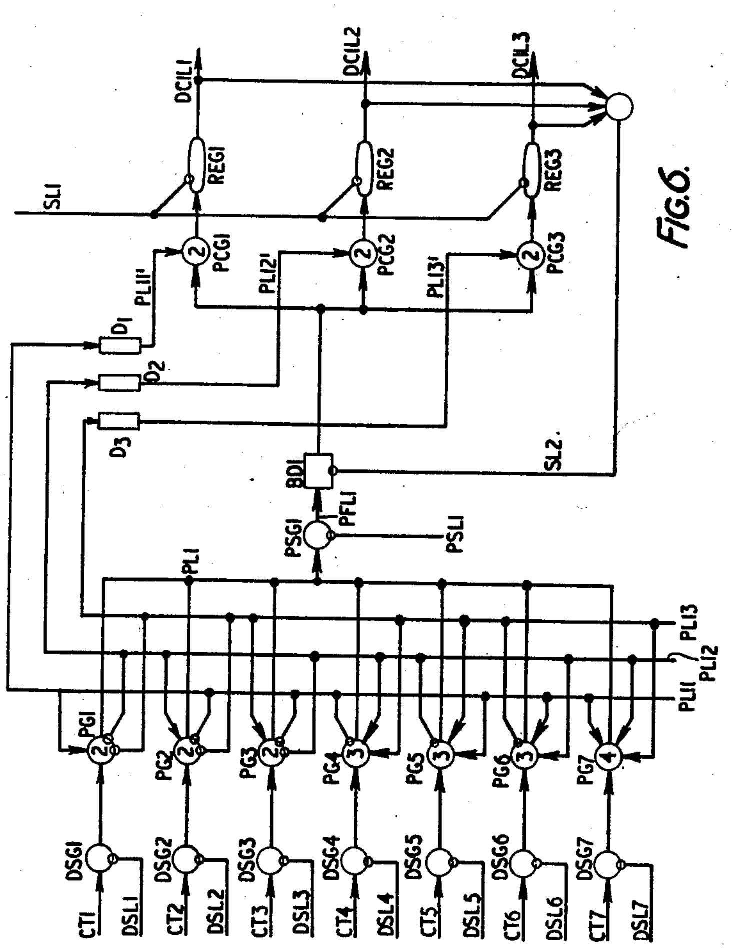
Fig. 6 is a block schematic diagram of another example.

Thus using "$n$" registers with their associated coincidence gates and pulse leads, $2^n-1$ different combinations may be used and each may be associated with a different circuit in the group. Fig. 5 shows an arrangement of 7 pulse trains P1–P7 on combinations of 3 pulse leads PL11, PL13, PL14 which may correspond to the pulse leads shown in Fig. 7 of the drawings accompanying the specification of the above mentioned patent to Harris. Fig. 6 of the accompanying drawings shows an arrangement whereby these three pulse leads may be used in an embodiment of the present invention to select one circuit out of a number of marked circuits in a group of 7 circuits.

Fig. 5 shows how the 7 pulse trains P1, P2 . . . P7 may be arranged on pulse leads PL11, PL12 and PL13 so that each appears on a single lead or on a combination of pulse leads individual to it. Thus P1, P2 and P3 appear on one lead each, P4, P5 and P6 appear on different combinations of the pulse leads taken two at a time and P7 appears on all three pulse leads. Clearly there are many similar ways of arranging the 7 pulse trains on the three pulse leads such that each appears on a combination individual to it. In fact there are 6! ways of so arranging them.

Fig. 6 shows seven D.C. marking leads CT1, CT2 . . . CT7, one for each circuit of a group of circuits from which a selection may be made. These seven marking leads are connected to D.C. suppression gates DSG1, DSG2 . . . DSG7 to which D.C. suppressing leads DSL1, DSL2 . . . DSL7 are connected such that the D.C. marking signals on some or all of the circuits may be removed. The outputs of DSG1, DSG2 . . . DSG7 are connected to pulse gates PG1, PG2 . . . PG7 to each of which pulse leads PL11, PL12 and PL13 are connected. Each gate is arranged so that one or more of the pulse leads act as operating leads the pulses on these leads acting as operating stimuli and the remainder as inhibiting leads the pulses on these leads acting as inhibiting stimuli and such that the operating lead or the combination of operating leads applied to each gate is individual to it. Thus the operating lead connected to PG1 is PL11 only; to PG2 is PL12 only; to PG3 is PL13 only; PL12 and PL13 are operating leads for PG4; PL11 and PL13 for PG5; PL11 and PL12 for PG6 while PL11, PL12 and PL13 are operating leads for PG7. In each case the remaining pulse leads, if any, are connected to the gate as inhibiting leads. The operation of each is such that when the marking signal is applied to the gate the pulse train appearing on the operating lead or coincidentally on all the operating leads but on none of the inhibiting leads applied to that gate then is transmitted to the output lead PL1 common to all seven gates. With the arrangement of pulse trains and pulse leads shown in Figs. 5 and 6 pulse trains P1, P2 . . . P7 are controlled by leads CT1, CT2 . . . CT7 respectively. It will be appreciated that the pulse leads PL11–13 and pulse gates PG1–7 replace the multiplex MX1 shown in Fig. 1 of the drawings. The gate circuits may comprise for example rectifier gate circuits of the type shown in Fig. 7 in which case each pulse train combination is generated, for example using a phase reversing pulse transformer, on two leads one for each polarity of the pulses.

Figure 7:
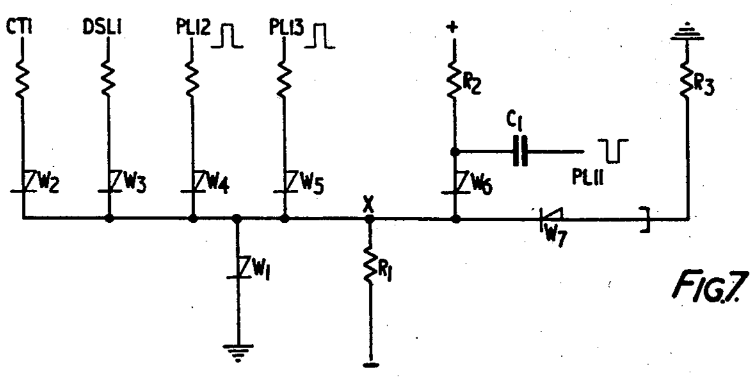
Fig. 7 is a circuit diagram of one form of pulse gate.

Fig. 7 shows a possible circuit for the gate PG1. It comprises a resistor R1 connected between point X which is near earth potential and a negative supply voltage such that a current I flows through R1. The point X is connected via rectifier W1 to earth so that if the current flowing into point X exceeds I the potential of X is clamped just above earth, by the low resistance of rectifier W1. The potential of point X can only fall below earth when there is insufficient current flowing into point X to keep rectifier W1 conducting in its forward direction. The marking lead CT1 is connected via rectifier W2 to point X and when the circuit for which the gate is provided is unmarked a current greater than I flows through rectifier W2 keeping point X substantially at earth. When the circuit is marked, the potential of lead CT1 falls and rectifier W2 is backed off. Lead DSL1 is connected via rectifier W3 to point X and if the associated circuit is unsuitable for selection the positive potential of lead DSL1 may cause a current greater than I to flow through rectifier W3, thus again keeping rectifier W1 conducting. If the circuit is suitable for selection the negative potential of lead DSL1 keeps rectifier W3 backed off. The inhibiting pulse leads, in this case leads PL12 and PL13, upon which positive versions of the pulse trains appear are connected via rectifiers W4 and W5 so that if a pulse appears on lead PL12 or PL13 a current greater than I flows through rectifier W4 or W5 keeping point X at earth. Each of the operating pulse leads, in this case PL11, only, is connected via a capacitor C1 to the junction of a resistor R2 connected to a positive potential supply and a rectifier W6 connected to point X such that a current greater than I normally flows through resistor R2 and rectifier W6 to point X keeping rectifier W1 conducting. The negative going pulses applied on lead PL11 back off rectifier W6, point X is also connected via rectifier W7 and resistor R3 in series connection to earth. Only when rectifiers W2, W3, W4, W5 and W6 are all backed off does rectifier W1 become backed off and the potential of point X falls below earth causing a pulse of amplitude approximately I.R3 to appear across resistor R3 which may be common to a number of gates. The circuit comprising resistor R2, capacitor C1 and rectifier W6 may be repeated for other circuits associated with combinations of two or more operating pulse leads.

Referring again to Fig. 6 the pulse trains of all the marked circuits suitable for selection appear on lead PL1 connected to PSG1, in which the circuits unsuitable for selection may be pulse deleted by the application of coincident pulse trains on PSL1. The output of PSG1 is connected to blocking device BD1, which, when a selection is to be made responds to one applied pulse and generates on its output a pulse which is applied to the coincidence gates PCG1, PCG2 and PCG3 to which versions of PL11, PL12 and PL13 are applied respectively on leads PL11′, PL12′ and PL13′. PL11, PL12 and PL13 are connected via delay networks D1, D2 and D3 respectively to leads PL11′, PL12′ and PL13′ respectively in order to compensate for the delays in transmission through and may be in the operation of BD1 which may be the well known blocking oscillator. If a pulse of P1 is generated by BD1 the pulse coincides in PCG1 with a pulse on PL11′ and is transmitted to operate REG1 using techniques for example as described in U.S. Patent No. 2,727,094. Similarly the operation of BD1 by pulses of other trains will cause other combinations of registers to become operated and the operated registers may D.C. indicate the selected circuits on the output leads DCIL1, DCIL2 and DCIL3 some combination of which will indicate the operated condition when a selection has been made. The fact that a register has been operated is also indicated on suppression lead SL2 applied to BD1 preventing it from generating any further pulses on its output.

After appropriate action has taken place a signal on suppression lead SL1 may be used to restore the registers to normal. This signal may be derived in the manner described above. The selected pulse trains may be caused to disappear from lead PFL1 in a manner similar to that described above.

Figure 8:
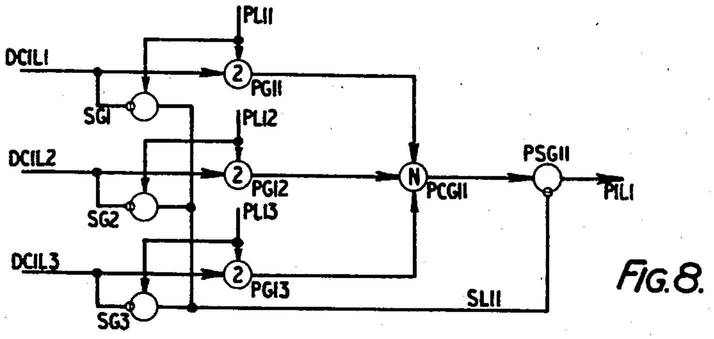
Fig. 8 is a block schematic diagram illustrating one method of deriving a pulse indication of a selected circuit.

Fig. 8 shows how a pulse indication of the selected circuit may be derived. The D.C. indicating leads DCIL1, DCIL2 and DCIL3 are connected to pulse gates PG11, PG12 and PG13 to which the associated pulse leads PL11, PL12 and PL13 are respectively connected such that on the outputs of the gates of operated registers appear the pulse trains of the circuits in the group also associated with the registers. These outputs are all connected to a pulse coincidence gate PCG11 which transmits the pulses appearing coincidently on all the inputs associated with operated registers. Thus if REG1 is the only register to be operated P1, P5, P6 and P7 all appear on the output of PCG11 whereas if REG2 and REG3 are both operated, P4 and P7 appear on the output of PCG 11 which is connected to the input of suppression gate PSG11. DCIL1, DCIL2, DCIL3 are also connected to suppression gates SG1, SG2 and SG3 respectively to which PL11, PL12 and PL13 are respectively connected and whose outputs are all connected to suppression lead SL11 on which appears the pulse trains of circuits associated with registers not operated by the output from BD1. Thus if REG1 is the only operated register, all the pulse trains on PL12 and PL13 appear upon SL11. Similarly if DCIL2 and DCIL3 are in their operated state all the pulse trains on PL11 appear upon SL11 and this lead is connected to PSG11 and pulses on the output of PCG11 are suppressed in PSG11 by coincident pulses on SL11. Thus on PIL1 appears only the pulse train of the circuit associated with the operated combination of registers that being the only pulse train appearing on all the pulse leads associated with operated registers and none of the others, and it is the pulse train characterising the selected circuit.

Figure 9:
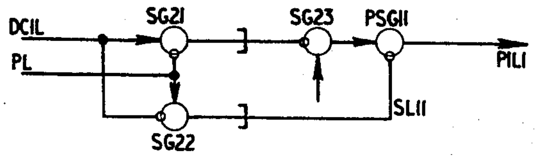
Fig. 9 is a block schematic circuit diagram.

Fig. 9 shows a second possible arrangement and is a more exact representation of the techniques illustrated in Fig. 8. Fig. 9 shows one of the D.C. indicating leads DCIL connected to two suppression gates SG21 and SG22 to both of which the associated pulse trains are applied over lead PL. In SG21 the pulse trains interrupt the stimulus applied to DCIL where its associated register is operated and a stimulus therefore appears upon its output provided the associated register is operated and except during the pulses of the associated pulse trains. The outputs of this and other similar gates provided for other registers are connected by a common lead to a suppression gate SG23 to which a D.C. source is connected and which is interrupted by the stimuli from SG21 and like gates. On the output of SG23 appear those pulse trains appearing on all the pulse leads associated with operated registers. These are applied to a pulse suppression gate PSG11 as in Fig. 8 in which the pulses associated with unoperated registers are deleted by pulses on SL11 connected to the outputs of SG22 and like suppression gates in which the applied pulse trains on PL are suppressed when the associated register is operated.

Figures 10, 11:
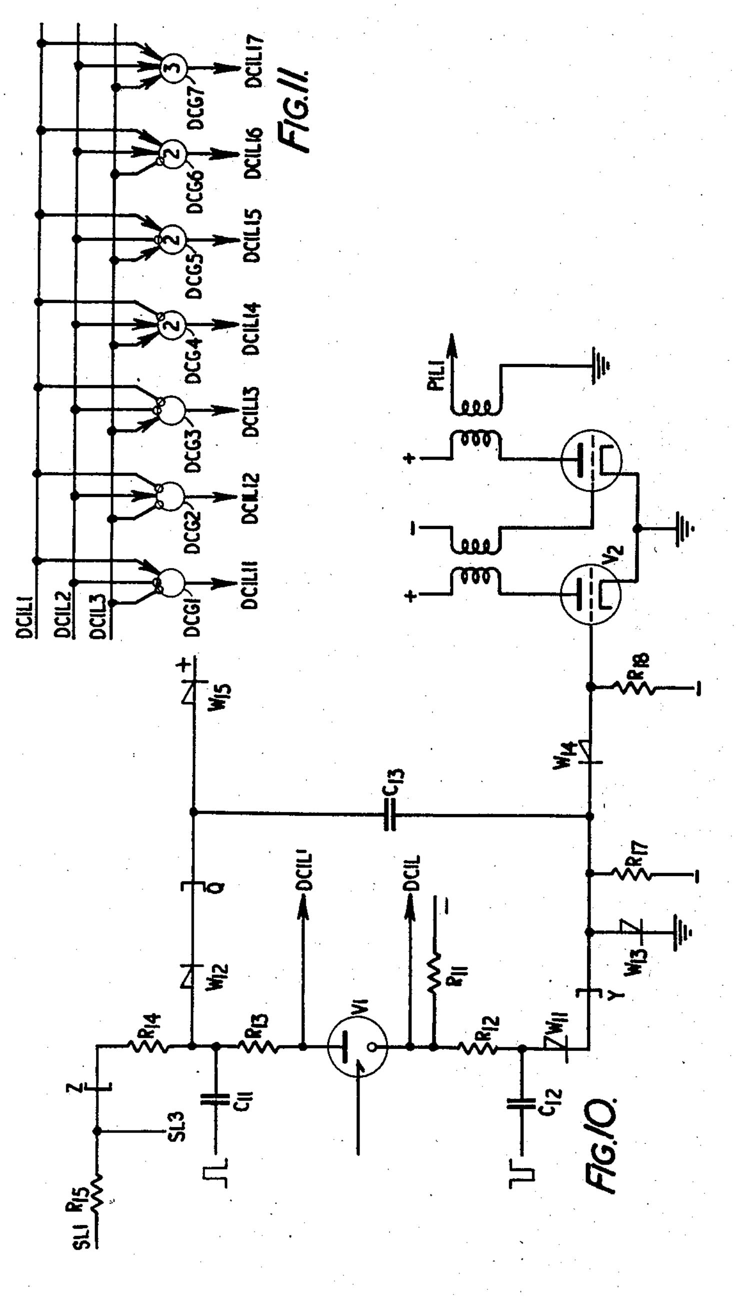
Fig. 10 is a circuit for obtaining a pulse indication.
Fig. 11 is a block schematic circuit diagram.

Fig. 10 shows one register comprising a cold cathode tube V1 which may be operated by applying a suitable potential to the striker. The cathode is connected to a negative supply voltage via resistor R11 and via a second resistor R12 and a rectifier W11 to a point Y which is near earth potential and which is common to all the registers in the set. When valve V1 is unoperated the rectifier W11 is backed off and the cathode D.C. indicating lead DCIL is near the negative supply voltage. The point Y is connected via rectifier W13 to earth and via resistor R17 to a negative supply sufficiently negative for a substantially constant current I to flow through it throughout the operation of the circuit. If the current flowing to the point Y exceeds I the excess current causes rectifier W13 to conduct in its low resistance direction and point Y is substantially at earth. Point Y is also connected via rectifier W14 to the grid of a triode V2 whose cathode is earthed and via a resistor R18 connected to a voltage supply just below earth. With no other current flowing into the point Y, the current I is drawn through rectifier W14 in its low resistance direction and through resistor R18 such that the grid of valve V2 is just beyond cut off. With a current greater than I flowing into point Y and with rectifier W13 conducting, rectifier W14 is backed off and valve V2 is conducting.

The anode of valve V1 is connected to the anode D.C. indicating lead DCIL′ and via a resistor R13 to a second resistor R14 and thence to a point Z common to all the registers. Point Z is connected to a control lead L1 via a resistor R15 which except during the normalising of the registers is at a positive potential. The junction point of resistors R14 and R13 is connected via rectifier W12 to a point Q common to all registers and Q is connected via rectifier W15 to a second positive potential which is say, 50 volts below that of lead SL3. The points Q and Y are connected together via capacitor C13 which performs the functions of SL11 in Fig. 8 and Fig. 9. Positive and negative versions of the pulse trains associated with V1 are connected via capacitors C11 and C12 respectively to the junction of resistors R13 and R14 and to the junction of resistor R12 and rectifier W11 respectively.

Before a selection is made none of the registers is operated and for each register the positive pulse trains applied via C11 cause rectifiers W12 and W15 to conduct at the peaks of the applied pulses such that during the intervals between the pulses of the register rectifier W12 is backed off and during the intervals between all the pulses applied to all the registers rectifier W15 is also backed off. The capacitor C11 will charge through resistors R14 and R15 in the intervals between the pulses and is discharged during the pulses via rectifiers W12 and W15. Since no registers are operated rectifier W14 will be conducting and valve V2 cut off at the control grid and the small amplitude pulses transmitted to point Y via capacitor C13 will have not caused valve V2 to conduct.

When a combination of registers is operated current flows through the operated cold cathode thyratrons and, assuming valve V1 is among those operated a current greater than I flows through resistor R12 which causes rectifier W11 to conduct except during the negative going pulses applied via capacitor C12. The current flowing into point Y from the operated registers will cause capacitor C13 to charge up via rectifier W15 such that the point Y is normally at earth causing rectifier W13 to conduct. Only when coincident pulses are applied to all the operated registers will point Y tend to go negative due to the current I flowing in resistor R17 and then only if no positive pulse is applied to point Y, via capacitor C13. For the operated registers the discharge current will back off the rectifiers such as W12 such that the positive pulses appearing at point Q are only those associated with unoperated registers. A pulse appearing at point Q coinciding with coincident pulses of the operated registers will cause a current I flowing through resistor R17 to charge capacitor C13 which will keep point Y at earth potential. This is discharged during the intervals between pulses by some of the current flowing into point Y from the operated registers. When a negative pulse is applied coincidently via capacitor C12 for all operated registers which does not coincide with any of the positive pulses supplied to unoperated registers the point Y will move negatively taking point Q with it thus causing a negative pulse to be applied to the control grid of valve V2 causing an output pulse to appear on the output lead PIL1 of the transformer coupled amplifier of which valve V2 is the first stage. Thus only those pulses associated with all the operated registers and with none of the unoperated registers will appear on lead PIL1 and these will constitute the pulse train characterising the selected circuit. The condition for the satisfactory operation of the circuit shown in Fig. 10 is that the current taken by the operated registers should be at least twice the current I and that the current taken through resistor R14 when valve V1 is unoperated should be at least half I with the pulses shown in Fig. 5.

When any register becomes operated the point Z will become more negative and this may be used to prevent the further operation of the blocking device BD1 over lead SL3 or alternatively the D.C. indicating leads DCIL or DCIL′ may be commoned via suitable decoupling means onto lead SL2 used for this purpose. The registers may be released by applying a negative pulse of appropriate length to the lead SL3 derived for example in a manner similar to that of the releasing signal described above with reference to Fig. 6.

Fig. 11 shows in logical form how individual D.C. indications may be derived so that the selected circuit may be D.C. indicated on a lead individual to it. It shows 7 gates DCG1 . . . DCG7 to which all the D.C. indicating leads are connected either as operating or inhibiting leads as already described for the marking pulse multiplex and in which it may be convenient to use both the phases shown in Fig. 10 as DCIL and DCIL′ one for the operating stimulus and one for the inhibiting. On one of the output indicating leads DCIL11 . . . DCIL17 will appear the indication of the selected circuit. The circuits used for these gates may take any of many well known forms.

It will be clear that only one method of carrying the invention into effect has been described and that there are many alternative ways of using it. For example all the combinations of registers would not be used if some of the pulses on the pulse distribution leads were omitted. Also the invention finds application in any system involving selection processes and although it has been here described in relation to the selection of circuits, the selector described may be used for the selection of anything provided that a pulse train may be generated for each thing when it is suitable for selection.

I claim:

1. A pulse selecting and indicating system for selecting and indicating a pulse from a group of pulses comprising in combination a pulse lead, a device connected to said lead and responsive to one of pulses applied to it over said lead, a plurality of pulse coincidence gates to which the output of said device is connected, a plurality of registers, the total number of combinations of which is at least equal to the number of pulses in said group, each register receiving the output from a different one of the pulse coincidence gates, a plurality of pulse sources each supplying a different combination of pulses of said group of pulses, a lead connecting each of said pulse sources to a different one of said coincidence gates, a pulse delay device in each of said leads and an indicating lead for each different combination of registers.

2. A pulse selecting and indicating system for selecting and indicating a pulse from a group of pulses comprising in combination a pulse lead, a device connected to said lead and responsive to one of pulses applied to it over said lead, a plurality of pulse coincidence gates to which the output of said device is applied, a plurality of registers providing a number of combinations of N registers at least equal to the number of pulses in the group of pulses, each register being connected to a different pulse coincidence gate, and, connected to each pulse coincidence gate, a pulse source supplying a different combination of pulses of said group of pulses and an indicating lead for each combination of registers.

3. A pulse train selecting system for selecting one pulse train from a group of pulse trains comprising in combination a pulse lead, a device connected to said lead and responsive to one of pulses appearing on said lead, a plurality of pulse coincidence gates to which the output of said device is connected, a plurality of registers, each register receiving the output from a different one of the coincidence gates, and, for each pulse coincidence gates, a lead connecting the gate to a source of unique combinations of pulse trains of the group of pulse trains whereby the register connected to the gate is operable by any pulse of any train of said combination, and a number of indicating leads each connected to a different register.

4. A system for selecting and indicating a pulse train from a group of pulse trains comprising in combination a pulse train input lead, means for applying to said pulse train input lead those pulse trains from which a selection is to be made, a pulse suppression gate connected to said pulse train input lead, a pulse train suppression lead connected to said pulse suppression gate, a pulse responsive device connected to said pulse suppression gate, a plurality of pulse coincidence gates all connected to said pulse responsive device, a single group of registers arranged in sets each consisting of a different combination of registers, the number of said sets of registers being equal to $2^n-1$, where $n$ is the number of registers, a connection from each register to a different pulse coincidence gate, a plurality of pulse train sources each supplying a different combination of pulse trains from said group of pulse trains and each connected to a different pulse coincidence gate, and an indicating lead for each set of registers.

5. A system for selecting and indicating a pulse from a group of pulses comprising a pulse input lead, means for applying to said pulse input lead pulses from which a selection is to be made, a pulse responsive device connected to said pulse input lead for response to one of the pulses thereon, a plurality of pulse coincidence gates each connected to said pulse responsive device, a single group only of registers arranged in sets each comprising a different combination of registers taken a fixed number, not less than 2, at a time, a connection from each register to a different one of said pulse coincidence gates, a plurality of pulse sources each supplying a different combination of pulses of said group of pulses and each connected to a different one of said coincidence gates, and an indicating lead for each set of registers.

References Cited in the file of this patent

UNITED STATES PATENTS

| | | |
|---|---|---|
| 2,512,676 | Ransom | June 22, 1950 |
| 2,584,739 | Rees et al. | Feb. 5, 1952 |
| 2,662,116 | Potier | Dec. 8, 1953 |
| 2,666,809 | Flowers | Jan. 19, 1954 |
| 2,683,731 | Ridlington | July 16, 1954 |
| 2,727,094 | Flowers et al. | Dec. 13, 1955 |
| 2,770,678 | Flowers | Nov. 13, 1956 |